United States Patent [19]

Utagawa et al.

[11] 4,339,665
[45] Jul. 13, 1982

[54] APPARATUS FOR DETECTING DISPLACEMENT OF OPTICAL IMAGE

[75] Inventors: Ken Utagawa, Yokohama; Hiroshi Shirasu, Kawasaki, both of Japan

[73] Assignee: Nippon Kogaku K.K., Tokyo, Japan

[21] Appl. No.: 123,211

[22] Filed: Feb. 21, 1980

[30] Foreign Application Priority Data

Mar. 9, 1979 [JP] Japan .................................. 54-26757

[51] Int. Cl.³ ............................................. H01J 40/14
[52] U.S. Cl. ..................................... 250/578; 250/209
[58] Field of Search ............... 250/201, 204, 208, 209, 250/578; 354/25; 356/4, 5; 358/105

[56] References Cited

U.S. PATENT DOCUMENTS

| | | | |
|---|---|---|---|
| 4,078,171 | 3/1978 | Stauffer | 250/201 |
| 4,083,056 | 4/1978 | Nakamura et al. | 354/25 |
| 4,218,623 | 8/1980 | Utagawa | 250/578 |

*Primary Examiner*—David C. Nelms

*Attorney, Agent, or Firm*—Fitzpatrick, Cella, Harper & Scinto

[57] ABSTRACT

Apparatus for detecting displacement of optical image is disclosed which comprises a photosensitive element array, a first circuit, a second circuit and a phase difference measuring circuit. The photosensitive element array is composed of a number of photosensitive elements disposed on and near the focal plane of an image forming optical system through which an optical image is formed. The first circuit multiplies the electric outputs from photosensitive elements in the array by vectors whose phases sequentially increase or decrease, and then adds the products together to form an added output. The second circuit multiplies the electric outputs from photosensitive elements slightly shifted from the above elements in the same array, and then adds the products together to form a second added output. The difference in phase between the first and second added outputs is measured by the phase difference measuring circuit.

3 Claims, 5 Drawing Figures

APPARATUS FOR DETECTING DISPLACEMENT OF OPTICAL IMAGE

BACKGROUND OF THE INVENTION

1. Field of the Invention

The present invention relates to an apparatus for detecting displacement of optical image on an array of photosensitive elements.

2. Description of the Prior Art

The applicant of the present application has already proposed an apparatus for producing an electric signal the phase of which varies depending upon the direction as well as the amount of displacement of an optical image projected on an array of photosensitive elements when the optical image is displaced in the direction in which photosensitive elements are arranged. The apparatus is the subject of U.S. patent application Ser. No. 959,918, now U.S. Pat. No. 4,218,623, the counterpart of which is German patent application No. 2,848,874.b-51. The apparatus mentioned above will be described hereinafter with reference to FIG. 1.

In FIG. 1, the reference numeral 1 designates a photosensitive element array composed of a number (in the shown case the number is eight) of photosensitive elements $P_1$-$P_8$. The photosensitive element array 1 is disposed on or close to a focal plane of an image forming optical system not shown and an optical image of an object is to be focused on the array. From the photosensitive element array 1 are issued photo-electric outputs of the respective elements $P_1$-$P_8$ or the related electric outputs $v_1$-$v_8$. Designated by 3 is a vectorizing circuit comprising eight multipliers $3a$-$3h$. These multipliers $3a$-$3h$ multiply the electric outputs $v_1$-$v_8$ by vectors $$\exp(i2\pi \times \tfrac{1}{8}), \exp\left(i2\pi \times \tfrac{2}{8}\right) \ldots \exp\left(i2\pi \times \tfrac{8}{8}\right)$$

respectively. As shown in FIG. 2, these vectors are phase-shifted by $(2\pi/8)$ one to another sequentially with the total completing one period.

An adder circuit 5 adds the outputs from the respective multipliers $3a$-$3h$ together to form the following added output V:

$$V = \sum_{n=1}^{8} V_n \exp\left(i2\pi \times \frac{n}{8}\right) \quad (1)$$

This added output V, as described in detail in the prior applications mentioned above, includes information of a spatial frequency component whose spatial period is d, that is, the length of the array of elements $P_1$-$P_8$, and information of other spatial frequency components in the vicinity of the above spatial frequency component.

The above relation may be generalized as follows:

Photosensitive elements, the number of which is M in total, are set in array to produce the respective electric outputs. If one multiplies the electric outputs by vectors which are phase-shifted by $(2\pi/N)$ one to another sequentially and then adds the products together, then one can obtain information of a spatial frequency component having a spatial period corresponding to the length of N photosensitive elements in the direction of array, and information of other spatial frequency components existing near the spatial frequency component.

When an optical image on the array 1 is displaced in any direction, the phase of the added output V will change in the following manner:

Let V' denote the added output obtained when the optical image on the array 1 is displaced by a distance corresponding to one photosensitive element leftward, then V' is given by $$V' = \sum_{n=1}^{8} v_{n+1} \cdot \exp\left(i2\pi \times \frac{n}{8}\right)$$

A transformation of the above equation gives:

$$V' = \sum_{n=1}^{8} v_n \cdot \exp\left(i2\pi \times \frac{n-1}{8}\right) -$$

$$v_1 \exp\left(i2\pi \times \frac{0}{8}\right) + v_9 \cdot \exp\left(i2\pi \times \frac{8}{8}\right)$$

From the relation, $$\exp\left(i2\pi \times \frac{0}{8}\right) = \exp\left(i2\pi \times \frac{8}{8}\right), \quad (2)$$

$$V' = \exp\left(-\frac{2\pi}{8}i\right) \sum_{n=1}^{8} v_n \exp\left(i2\pi \times \frac{n}{8}\right) +$$

$$\exp\left(i2\pi \times \frac{8}{8}\right)(v_9 - v_1)$$

In the above equations, $v_1$ is the electric output related to the intensity of light coming from the area of the array 1 due to the displacement of the optical image and $v_2$ is the electric output related to the intensity of light newly introduced into the area of the array 1 as the result of the displacement.

As seen from the above, if the second term $$\exp\left(i2\pi \times \frac{8}{8}\right)(v_9 - v_1)$$

in the equation (2) is negligible relative to the first term, then the added output V' after the displacement of optical image, differs from the added output V before the displacement, only in that the phase of the former gets delayed from the latter by $(2\pi/8)$ as will be understood from the equations (1) and (2).

In other words when the above second term is negligible, a leftward or rightward displacement of the optical image by a distance corresponding to one photosensitive element brings about a change in phase of the added output by a constant value $-(2\pi/8)$ or $+(2\pi/8)$.

However, here, note should be taken of the ratio of M to N. As described above, M is the total number of photosensitive elements constituting a photosensitive element array and in the shown case M is 8. N is the number of photosensitive elements corresponding to the spatial length d and in the shown case N is 8. When the ratio is small, for example, 1, 2 or 3, it is impossible to neglect the above-mentioned second term and the change of phase relative to the displacement of optical image can not be constant. To make it constant, M must be about 10 times larger than N. But, the use of such a large ratio of M:N brings forth another problem. Namely, in such case, information containable in the added output V is limited to only those of the spatial frequency component of the spatial period d and of the spatial frequency component very near the above component. Therefore, for an optical image containing little of such spatial frequency component of the spatial period d it becomes impossible to detect the displacement of the optical image. This means that optical images for which the apparatus can detect the displacement are undesirably limited to a great extent.

SUMMARY OF THE INVENTION

Accordingly, the object of the present invention is to provide an apparatus for detecting displacement of an optical image which produces a signal capable of giving the measure of phase shift caused by a certain definite amount of displacement of the optical image on an array.

Other and further objects, features and advantages of the invention will appear more fully from the following description taken in connection with the accompanying drawing.

DESCRIPTION OF THE PREFERRED EMBODIMENTS

Figure 3:
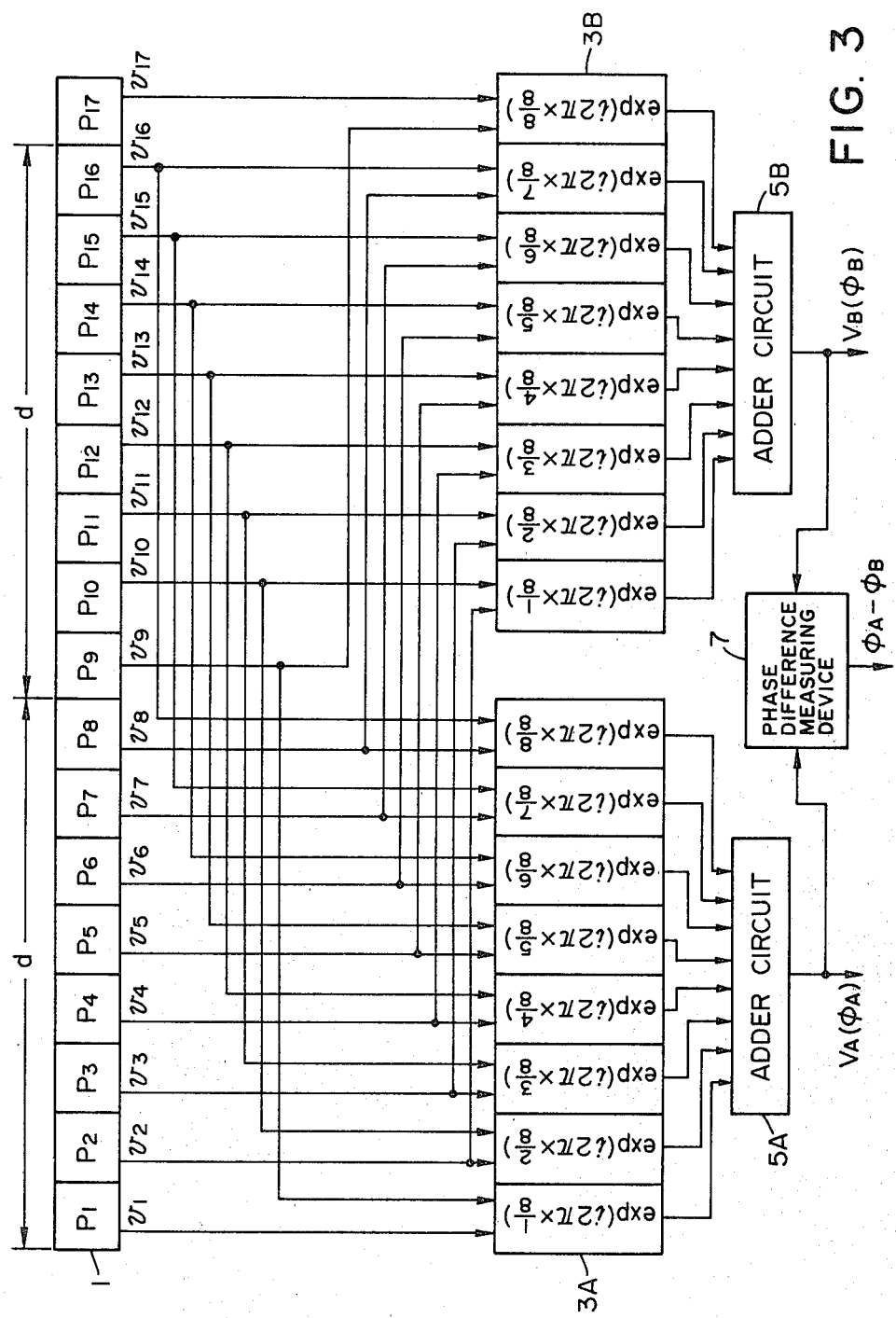
FIG. 3 is a block diagram showing an embodiment of the invention.

Referring to FIG. 3 showing a preferred embodiment of the invention, reference character 1 designates a photosensitive element array comprising photosensitive elements $P_1$ to $P_{17}$. The apparatus shown in FIG. 3 includes two vectorizing circuits 3A and 3B. The vectorizing circuit 3A functions to multiply the electric outputs $v_1-v_8$ from photosensitive elements $P_1-P_8$ and $v_9-v_{16}$ from photosensitive elements $P_9-P_{16}$ by vectors $$\exp(i2\pi \times \tfrac{1}{8}) \ldots \exp\left(i2\pi \times \tfrac{8}{8}\right)$$

respectively.

An adder circuit 5A adds outputs from the vectorizing circuit 3A together to form an added output having an amplitude $V_A$ and a phase $\phi_A$.

The other vectorizing circuit 3B functions to multiply the electric outputs $v_2-v_9$ from photosensitive elements $P_2-P_9$ and $v_{10}-v_{17}$ from $P_{10}-P_{17}$ by vectors $$\exp(i2\pi \times \tfrac{1}{8}) \ldots \exp\left(i2\pi \times \tfrac{8}{8}\right)$$

respectively. Thus, the vectorizing circuit 3B processes the outputs of the groups of photosensitive elements shifted by one photosensitive from those to be processed by the vectorizing circuit 3A with the same vectors.

An adder circuit 5B adds output from the vectorizing circuit 3B together to form an added output having an amplitude $V_B$ and a phase $\phi_B$.

In this manner, the apparatus for detecting displacement of an optical image in this embodiment comprises two detection units, one including $P_1-P_{16}$, 3A and 5A and the other including $P_2-P_{17}$, 3B and 5B. The total number M of photosensitive elements contained in each unit is 16 and the number N of photosensitive elements corresponding to the spatial length d is 8. Therefore, the respective units process two period amount of the spatial frequency component having the spatial period d to produce the added outputs $V_A$ and $V_B$.

As described above, the vectorizing circuit 3B multiplies the electric outputs from those photosensitive elements shifted rightward by one element as compared with the circuit 3A, by the same vectors as in the circuit 3A. Therefore, the added output $V_B$ is equal to the added output $V_A'$ which is produced when the optical image is displaced rightward by one photosensitive element. A phase difference measuring device 7 measures the phase difference $\phi_A - \phi_B$ between the two added outputs $V_A$ and $V_B$. This phase difference $\phi_A - \phi_B$ corresponds to the real magnitude of change in phase $\phi_A$ or $\phi_B$ occurring when the optical image is displaced by one photosensitive element on the array 1. A displacement of optical image in an amount of one photosensitive element must bring about a change of phase $\phi_A$ or $\phi_B$ by $(2\pi/8)$ so long as the second term of the above equation (2) is negligible. If the phase difference $\phi_A - \phi_B$ measured is different from the value $(2\pi/8)$, it indicates that for the given optical image the second term is not negligible. In such case where the second term is not negligible, the real amount of displacement of optical image relative to the found value of change in phase $\phi_A$ or $\phi_B$ can be obtained from the phase difference $\phi_A - \phi_B$ in the following way:

For example, assuming that there occurred a displacement of optical image and the phase of the added output $V_A$ or $V_B$ was changed by $\Delta\phi_A$ or $\Delta\phi_B$ when $\phi_A - \phi_B = \Delta\phi$, then the real displacement of the optical image can be considered approximately equal to $(\Delta\phi A/\Delta\phi) \times$ (width of one photosensitive element), $(\Delta\phi B/\Delta\phi) \times$ (the width) or $$\frac{(\Delta\phi A + \Delta\phi B)}{2 \times \Delta\phi} \times \text{(the width).}$$

Figure 4:
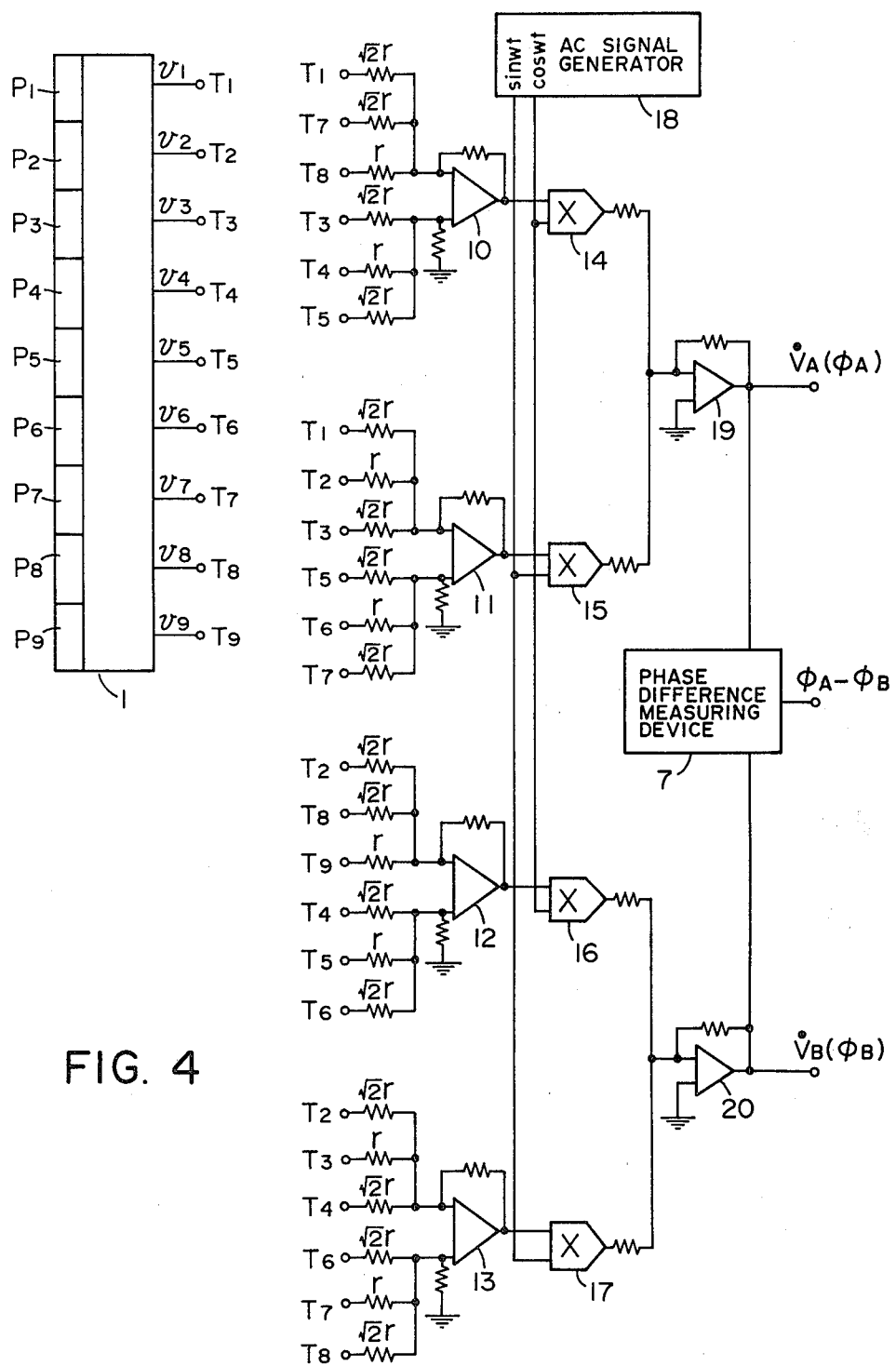
FIG. 4 shows a concrete circuit corresponding to the block diagram shown in FIG. 3.

FIG. 4 shows a concrete example of a circuit according to the embodiment shown in FIG. 3. The concrete example is of the circuit which processes one period amount of spatial frequency component.

While the connection lines are not shown in FIG. 4 for the sake of simplification of the drawing, the output terminals $T_1-T_9$ of the array 1 are connected with the corresponding input terminals $T_1-T_9$ of the vectorizing circuit 3A, 3B respectively. Vectorizing circuit 3A and adder circuit 5A are composed of operational amplifiers 10, 11 and their input resistors whereas vectorizing circuit 3B and adder circuit 5B are composed of operational amplifiers 12, 13 and their input resistors. Each vectorizing circuit multiplies the related electric outputs by $$\exp(i2\pi \times \tfrac{1}{8}) \ldots \exp\left(i2\pi \times \tfrac{8}{8}\right)$$

in the form of coordinate components of the vectors respectively. The operational amplifier 10 and its six input resistors multiply the electric outputs $v_1$–$v_8$ by x-components of the vectors $$\exp(i2\pi \times \tfrac{1}{8}) \ldots \exp\left(i2\pi \times \tfrac{8}{8}\right),$$

namely $\cos(2\pi \times \tfrac{1}{8}) \ldots \cos(2\pi \times \tfrac{8}{8})$ respectively and then the products are added together to obtain the x-component $V_{Ax}$ of added output $V_A$. More specifically, electric outputs $v_1$, $v_2$, $v_3$, $v_4$, $v_5$, $v_6$, $v_7$ and $v_8$ are multiplied by vector x-components $$\cos(2\pi \times \tfrac{1}{8}) = \tfrac{1}{\sqrt{2}}, \cos\left(2\pi \times \tfrac{2}{8}\right) = 0,$$

$$\cos(2\pi \times \tfrac{3}{8}) = -\tfrac{1}{\sqrt{2}},$$

$$\cos\left(2\pi \times \tfrac{4}{8}\right) = -1 \cos(2\pi \times \tfrac{5}{8}) = -\tfrac{1}{\sqrt{2}},$$

$$\cos\left(2\pi \times \tfrac{6}{8}\right) = 0,$$

$$\cos(2\pi \times \tfrac{7}{8}) = \tfrac{1}{\sqrt{2}} \text{ and } \cos\left(2\pi \times \tfrac{8}{8}\right) = 1$$

respectively and then the products are added. To this end, the electric outputs $v_1$, $v_7$ and $v_8$ are connected to one input terminal of the operational amplifier 10 through the resistors $\sqrt{2}r$, $\sqrt{2}r$ and $r$ having the resistance values reciprocal to the x-components $1/\sqrt{2}$, $1/\sqrt{2}$ and 1 by which the outputs $v_1$, $v_7$ and $v_8$ are to be multiplied. Similarly, electric outputs $v_3$, $v_4$ and $v_5$ are connected to the other input terminal of the operational amplifier 10 through the resistors $\sqrt{2}r$, $r$ and $\sqrt{2}r$ having the resistance values reciprocal to the x-components $-(1/\sqrt{2})$, $-1$ and $-(1/\sqrt{2})$ by which the outputs $v_3$, $v_4$ and $v_5$ are to be multiplied. Since the x-components by which the remaining electric outputs $v_2$ and $v_6$ are to be multiplied are 0, the two signals $v_2$ and $v_6$ are not put into the operational amplifier 10.

In the same manner, the operational amplifier 11 and its six input resistors multiply the electric signals $v_1$–$v_8$ by the y-components of vectors $$\exp(i2\pi \times \tfrac{1}{8}) \ldots \exp\left(i2\pi \times \tfrac{8}{8}\right),$$

namely $\sin(2\pi \times \tfrac{1}{8}) \ldots \sin\left(2\pi \times \tfrac{8}{8}\right)$ and then add the products together to produce the y-component $V_{Ay}$ of added output $V_A$.

A third set of operational amplifier 12 and six input resistors and a fourth set of operational amplifier 13 and six input resistors multiply the electric outputs $v_2$–$v_9$ by the x-components and y-components of the vectors $$\exp(i2\pi \times \tfrac{1}{8}) \ldots \exp\left(i2\pi \times \tfrac{8}{8}\right)$$

and then add the products together to obtain the x-component $V_{Bx}$ and y-component $V_{By}$ of added output $V_B$ respectively.

AC signal generator 18 generates two signals $\sin(wt)$ and $\cos(wt)$ which are phase shifted from each other by $(\pi/2)$.

Multipliers 14 and 15 multiply the output $V_{Ax}$ from the operational amplifier 10 by the signal $\cos(wt)$ from the generator 18 and the output $V_{Ay}$ from the operational amplifier 11 by the signal $\sin(wt)$ respectively. Similarly, multiplier 16 multiplies output $V_{Bx}$ by $\cos(wt)$ and multiplier 17 output $V_{By}$ by $\sin(wt)$.

Adders 19 and 20 add the outputs from multipliers 14 and 15 and the outputs from multipliers 16 and 17 to produce outputs $\dot{V}_A$ and $\dot{V}_B$ respectively. These outputs $\dot{V}_A$ and $\dot{V}_B$ are represented as follows:

$$\dot{V}_A = V_{Ax} \cos wt + V_{Ay} \sin wt = V_A \cos(wt + \phi A)$$

wherein, $$V_A = \sqrt{V_{Ax}2 + V_{Ay}2}$$

and $$\phi A = \tan^{-1}(V_{Ay}/V_{Ax}),$$

$$\dot{V}_B = V_{Bx} \cos wt + V_{By} \sin wt = V_B \cos(wt + \phi B)$$

wherein, $$V_B = \sqrt{V_{Bx}2 + V_{By}2}$$

and $$\phi B = \tan^{-1}(V_{By}/V_{Bx}).$$

The phase difference measuring circuit 7 makes the phase difference $\phi_A - \phi_B$ from the outputs $\dot{V}_A$ and $\dot{V}_B$ of adders 19 and 20.

In the above embodiment, the photosensitive elements to be multiplied by vectors in the vectorizing circuit 3A and the photosensitive elements to be multiplied by the same vectors in circuit 3B are shifted from each other by one element. However, the amount of shift is not limited to one photosensitive element only. To know the changing amount of phase relative to displacement of the optical image it is desirable to make the shift small. For this reason, the amount of shift by one photosensitive element was selected for the embodiment. Although this amount of shift is preferred, other amounts of shift, for example, by two photosensitive elements also may be used.

Figure 1:
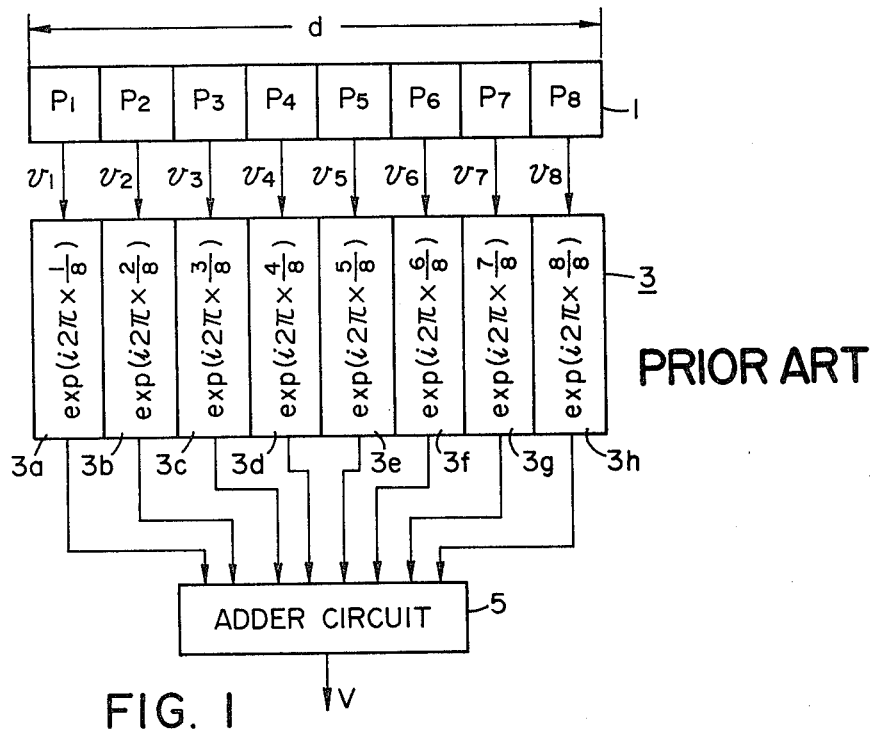
FIG. 1 shows the fundamental arrangement of a circuit used in apparatus for detecting displacement of an optical image according to the prior art.
Figure 2:
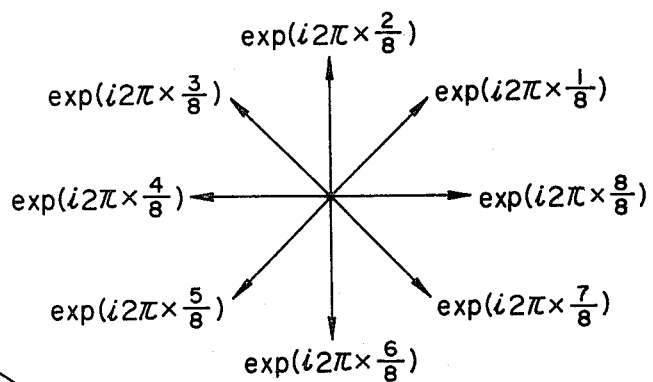
FIG. 2 shows the relation between the phases of vectors in the detection apparatus.
Figure 5:
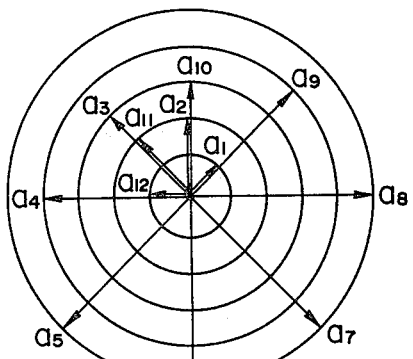
FIG. 5 shows the relation between vectors in phase and amplitude.

It is not always necessary for the above vector series to have absolute values all equal. If desired, the absolute values may be different from each other. For example, the absolute values of vectors may be so determined as to lessen the influence of the second term of equation (2) relative to the first term. More specifically, as shown in FIG. 5, vector series $a_1-a_{12}$ can be determined as follows:

$$a_1 = \frac{1}{5} \exp(i2\pi \times \tfrac{1}{8})$$

$$a_2 = \frac{2}{5} \exp\left(i2\pi \times \frac{2}{8}\right)$$

$$a_3 = \frac{3}{5} \exp(i2\pi \times \tfrac{3}{8})$$

$$a_4 = \frac{4}{5} \exp\left(i2\pi \times \frac{4}{8}\right)$$

$$a_5 = \exp(i2\pi \times \tfrac{5}{8})$$

$$a_6 = \exp\left(i2\pi \times \frac{6}{8}\right)$$

$$a_7 = \exp(i2\pi \times \tfrac{7}{8})$$

$$a_8 = \exp\left(i2\pi \times \frac{8}{8}\right)$$

$$a_9 = \frac{4}{5} \exp\left(i2\pi \times \frac{9}{8}\right)$$

$$a_{10} = \frac{3}{5} \exp\left(i2\pi \times \frac{10}{8}\right)$$

$$a_{11} = \frac{2}{5} \exp\left(i2\pi \times \frac{11}{8}\right)$$

$$a_{12} = \frac{1}{5} \exp\left(i2\pi \times \frac{12}{8}\right)$$

This vector series $a_1$ to $a_{12}$ covers one and half periods of the spacial frequency component. Vectors $a_1$, $a_2$, $a_3$ and $a_4$ near one end of the series and $a_9$, $a_{10}$, $a_{11}$ and $a_{12}$ near the other end of the series are selected in such manner that their absolute values become gradually smaller toward the respective ends of the series. This makes it possible to lessen the influence of the second term. It is desirable that the absolute values of vectors be determined in such manner that the composite vector from the selected vector series becomes zero vector. By determining the absolute values of vectors in this manner there is obtained a preferred added output V which should be zero when an optical image having a uniform illumination distribution is projected on the array. It is more preferable that the absolute values be determined, as in the case of above vectors $a_1-a_{12}$, in such manner that the absolute values of the composite vectors resulting from the same phase vectors ($a_1$, $a_9$), ($a_2$, $a_{10}$), ($a_3$, $a_{11}$) and ($a_4$, $a_{12}$) become equal to each other and also equal to each of the absolute values of the remaining vectors $a_5$, $a_6$, $a_7$ and $a_8$.

While the invention has been particularly shown and described with reference to preferred embodiments thereof, it will be understood by those skilled in the art that the foregoing and other changes in form and details can be made therein without departing from the spirit and scope of the invention.

We claim:

1. Apparatus for detecting displacement of an optical image formed through an image forming optical system, said apparatus comprising:
   (1) a photosensitive element array comprising a number of photosensitive elements disposed to receive light passed through said image forming optical system;
   (2) a first circuit for multiplying the electric outputs from photosensitive elements in said array by vectors whose phases increase sequentially in the order of the arranged elements and adding the products together to form an output;
   (3) a second circuit for multiplying the electric outputs from photosensitive elements in the same array but shifted from those elements processed by said first circuit by the same vectors as in the first circuit sequentially in the order of the arranged elements and adding the products together to form an output; and
   (4) a phase difference measuring circuit for measuring the difference in phase between said outputs from the first and second circuits.

2. Apparatus according to claim 1 wherein said shift is in an amount of one photosensitive element.

3. Apparatus according to claim 1 wherein the phase rate of said vectors is constant.

* * * * *